United States Patent [19]
Ma et al.

[11] Patent Number: 5,745,418
[45] Date of Patent: Apr. 28, 1998

[54] FLASH MEMORY MASS STORAGE SYSTEM

[75] Inventors: Chung-Wen Ma; Chun-Hung Lin; Tai-Yao Lee; Li-Jen Lee, all of Hsin Chu; Ju-Xu Lee, Bing Dong, all of Taiwan; Ting-Chung Hu, Milpitas, Calif.

[73] Assignee: Macronix International Co., Ltd., Hsinchu, Taiwan

[21] Appl. No.: 756,304

[22] Filed: Nov. 25, 1996

[51] Int. Cl.$^6$ .................................................. G11C 13/00
[52] U.S. Cl. ........................... 365/185.33; 365/189.01
[58] Field of Search ....................... 365/185.33, 189.01, 365/230.01

[56] References Cited

U.S. PATENT DOCUMENTS

| | | | |
|---|---|---|---|
| 5,341,339 | 8/1994 | Wells | 365/218 |
| 5,388,083 | 2/1995 | Assar et al. | 365/218 |
| 5,448,577 | 9/1995 | Wells et al. | 371/40.1 |
| 5,459,850 | 10/1995 | Clay et al. | 395/497.02 |
| 5,473,753 | 12/1995 | Wells et al. | 395/182.03 |
| 5,473,765 | 12/1995 | Gibbons et al. | 395/500 |
| 5,633,824 | 5/1997 | Onuki | 365/185.33 |

*Primary Examiner*—Terrell W. Fears
*Attorney, Agent, or Firm*—Mark A. Haynes; Wilson, Sonsini, Goodrich & Rosati

[57] ABSTRACT

An architecture for a mass storage system using flash memory is described. This architecture involves organizing the flash memory into a plurality of blocks. These blocks are then divided into several categories. One of the categories is a working category used to store data organized in accordance with a pre-defined addressing scheme (such as the logical block address used in Microsoft's operating system). The other category is a temporary buffer used to store data intended to be written to one of the working blocks. Another category contains blocks that need to be erased. When data is written into the mass storage system, a block in the second category is allocated from a block in the third category. The allocated block will then be changed to a block in the first category when writing to the allocated block is completed. The correspond block in the first category is placed into the third category. As a result, blocks can be recycled. Consequently, there is a constant supply of blocks in the second category. In another embodiment of the present invention, a new category is developed to handle random writing to the working blocks.

14 Claims, 12 Drawing Sheets

FLASH MEMORY MASS STORAGE SYSTEM

FIELD OF THE INVENTION

This invention relates to the field of mass storage for computers. More particularly, this invention relates to an architecture for a semiconductor non-volatile memory, and in particular flash memory.

BACKGROUND OF THE INVENTION

Modern information processing systems make extensive use of nonvolatile random access memory devices as mass storage for storing programs and data. The most widely used nonvolatile memory device is hard disks, which are electromechanical devices that store data on magnetic material. Recently, semiconductor nonvolatile memory has been developed. One type of semiconductor nonvolatile memory is flash memory which is comprised of a large plurality of floating gate metal oxide silicon field effect transistors arranged as memory cells in typical row and column array. The floating gate design allows information to be retained after power is removed. Flash memory has a number of characteristics which adapt it to be used as mass storage in information processing systems: it is light in weight, occupies very little space, and consumes less power than electromechanical devices. Further, it is rugged, and can withstand repeated drops that could destroy electro-mechanical devices.

Flash memory typically contains a plurality of single transistor memory cells which are programmable through hot electron injection and erasable through Fowler-Nordheim tunneling. The programming and erasing of such a memory cell require current to pass through the dielectric surrounding a floating gate electrode. It is found that the dielectric will fail after a certain number of programming and erasing. Because of this property, such types of memory have a finite number of erase-write cycles. Manufacturers of flash cell devices specify the limit for the number erase-write cycles as between 10,000 and 100,000. This is different from other types of memory devices, such as rotating magnetic media (e.g., hard disk) and volatile memory chips (such as dynamic random access memory and static random access memory), which can go through millions of erase-write cycles before failure. As a result, it is desirable to reduce the number of erase-write cycle in flash memory.

Flash memory is typically erased by applying a high voltage to the source terminals of the cells in the memory. Because these source terminals are all connected to one another by metallic busing, the entire memory (or some sub-portions thereof) needs to be erased at the same time. Thus, in an erase operation, valid data along with invalid (dirty) data are erased. This is different from other random access memory devices in which individual bits can be erased and written.

Another difference between flash memory and other types of memory devices is that erase cycles in a flash memory device is slow (when compared to the read-write time of other types of memory devices). This property can significantly reduce the performance of a system utilizing flash memory as its mass storage, unless this system is specially design to compensate for the slow erase cycle.

It can be seen from the above that a new memory architecture needs to be designed so as to effectively use flash memory as mass storage devices.

SUMMARY OF THE INVENTION

The present invention relates to a new architecture of a flash memory system. This architecture is designed to overcome some of the above mentioned problems of using flash memory to store data. This architecture involves organizing physical memory cells into a logical structure comprising blocks and sectors. In an embodiment of the present invention, a buffer (called the "entry buffer") is used to map the physical memory into logical arrangement. By changing the content of the entry buffer, the same physical memory can be used to perform different logical functions.

One application of the present architecture is that the memory system can be used to store data which has been arranged according to a sector-based addressing scheme. An example of such a scheme is the "logical block address" (LBA) used in Microsoft DOS file system. The present invention provides a flexible method of using the logical structure to process data organized in the sector-based addressing schemes.

One of the special properties of flash memory is that individual cells may not be overwritten directly with new data. This is different from other memory devices in which each bit can be changed at will. Consequently, conventional reading and writing methods cannot be used. The present invention involves a new method of writing into and reading from this logical structure. This method uses a buffer (called the Q buffer in the present invention) to accept new data, instead of directly overwrites the old data. The Q buffer is later transformed so as to replace the blocks containing old data (called a dirty block). The old block replaced by the buffer can be erased and then used for other purposes. A new block is then allocated to be a new buffer. The use of the above described entry buffer facilitates this transformation.

One consequent of this writing method is that blocks are capable of recycled (i.e., a dirty block can be changed to logically to other types of blocks). This is because the present architecture needs a continuous supply of Q buffers. If blocks are not recycled, there come a time when all the blocks are used and no more blocks can be allocated as Q buffers. Thus, the architecture of the present invention provides for a method to recycle blocks so that erased blocks can eventually be used as a buffer.

In order to improve the performance of the present architecture, a new type of buffers is introduced. The above described Q buffer is not efficient in handling random updating of data. This buffer serves to accept this types of writing. It is found that this new buffer can reduce the number of times the Q buffers are erased. The performance of the system is improved because it takes a relatively long time to erase a block.

These and other features of the present invention will become apparent from the following description when read in conjunction with the accompanying drawings.

DETAIL DESCRIPTION OF THE INVENTION

The present invention comprises a novel memory architecture and related methods. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

An essential function of a memory system is to store data. Further, software applications should be able to read from and write to the memory system. Flash memory has many characteristics which are different from conventional memory. Consequently, the architecture of a flash memory system needs to be organized to overcome any difficulty and make use of any advantageous features. One difference is that existing data in flash memory cannot be directly overwritten with new data. The flash memory needs to be erased first so that it becomes "clean" memory. New data can then be written into the clean memory. In contrast, data in dynamic random access memory (DRAM), static random access memory (SRAM) and hard disk can be directly overwritten. This is one of the reasons the architecture of a flash memory system is different from conventional memory system.

Because each block can be erased only a relatively small number of times (compared to conventional memory) before becoming unusable. Consequently, there is a need to reduce unnecessary erasure cycles.

In addition to the need to overcome the above described technical problems associated with flash memory, the performance of the system must be high and the cost low. Otherwise, it is not possible for a flash memory system to compete in the market place. One of the consequences of this requirement is that the architecture should not contain too much overhead. Thus, the hardware and software support (e.g., buffers, program code, etc.) need to be low, the data structure and algorithms need to be simple, and reliability and performance need to be high. The flash memory system of the present invention is designed to meet these requirements.

Figure 1A:
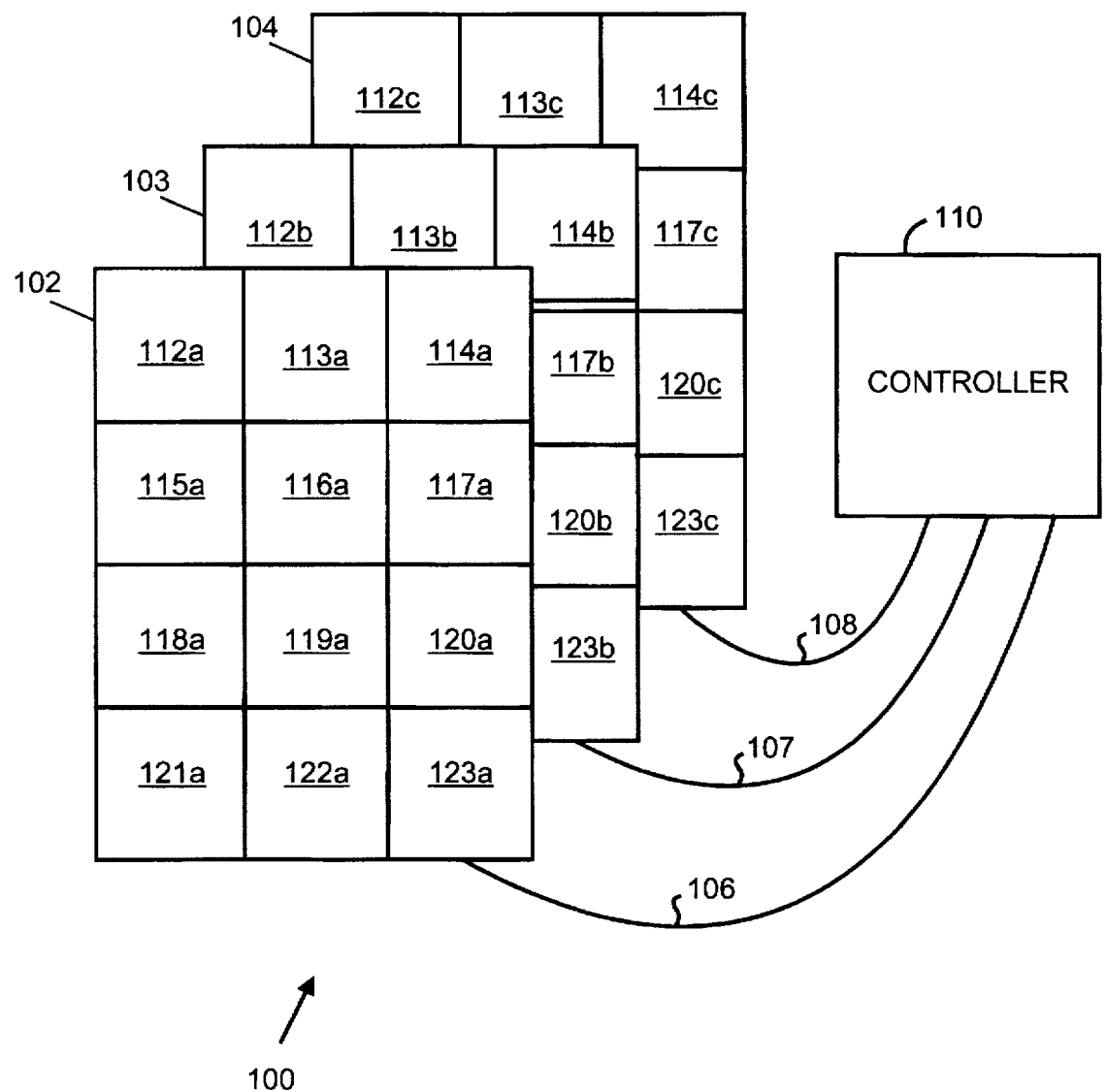
FIG. 1A is a schematic diagram of a flash memory system of the present invention.

(A) Description of the System Architecture (1) Dividing Memory Cells into Blocks FIG. 1A is a schematic drawing of a flash memory system 100 of the present invention. System 100 contains one or more flash memory chips for storing data and program, such as chips 102–104. These chips are electrically connected to a controller 110 via lines 106–108. In an embodiment of the present invention, these lines could be part of a bus for communicating digital data. Controller 110 performs a variety of functions (to be described in detail below), such as organizing flash memory chips 102–104 into memory blocks, allocating these memory blocks for different purposes, interface with devices external to system 100, etc. Controller 110 could be a dedicated data processing device. Alternatively, the functions of controller 110 could be performed by a general purpose microcomputer system consisting a central processing unit (CPU), random access memory (RAM), read-only memory (ROM), and a hard disk. In one application of the present invention, flash memory system 100 emulates the function and operation of a hard disk. In this application, the microcomputer system treats system 100 as a generic hard disk. Alternatively, flash memory system 100 could have an organization optimized for use in specialized systems, such as video game cartridges and industrial control data loggers.

Each memory chip may be divided into several memory blocks. Each memory block contains a large number of erasable programmable read-only memory cells that can store bits of data. For example, chip 102 is divided into blocks 112a–123b. Similarly, chips 103 and 104 are divided into blocks 112b–123b and 112c–123c, respectively. In a preferred embodiment, each of chips 102–104 is divided into the same number of blocks. However, it should be noted that the chips may have different number of blocks.

(2) Logical Organization of the Physical Blocks

The blocks in chips 102–104 must be logically organized so that they can provide a flexible system for storing data. One method of organization is to provide means for mapping physical blocks into logical structure. In the present invention, a special buffer is used for this mapping. By changing the content in this buffer, the same physical block can be mapping into different logical organization.

Figure 1B:
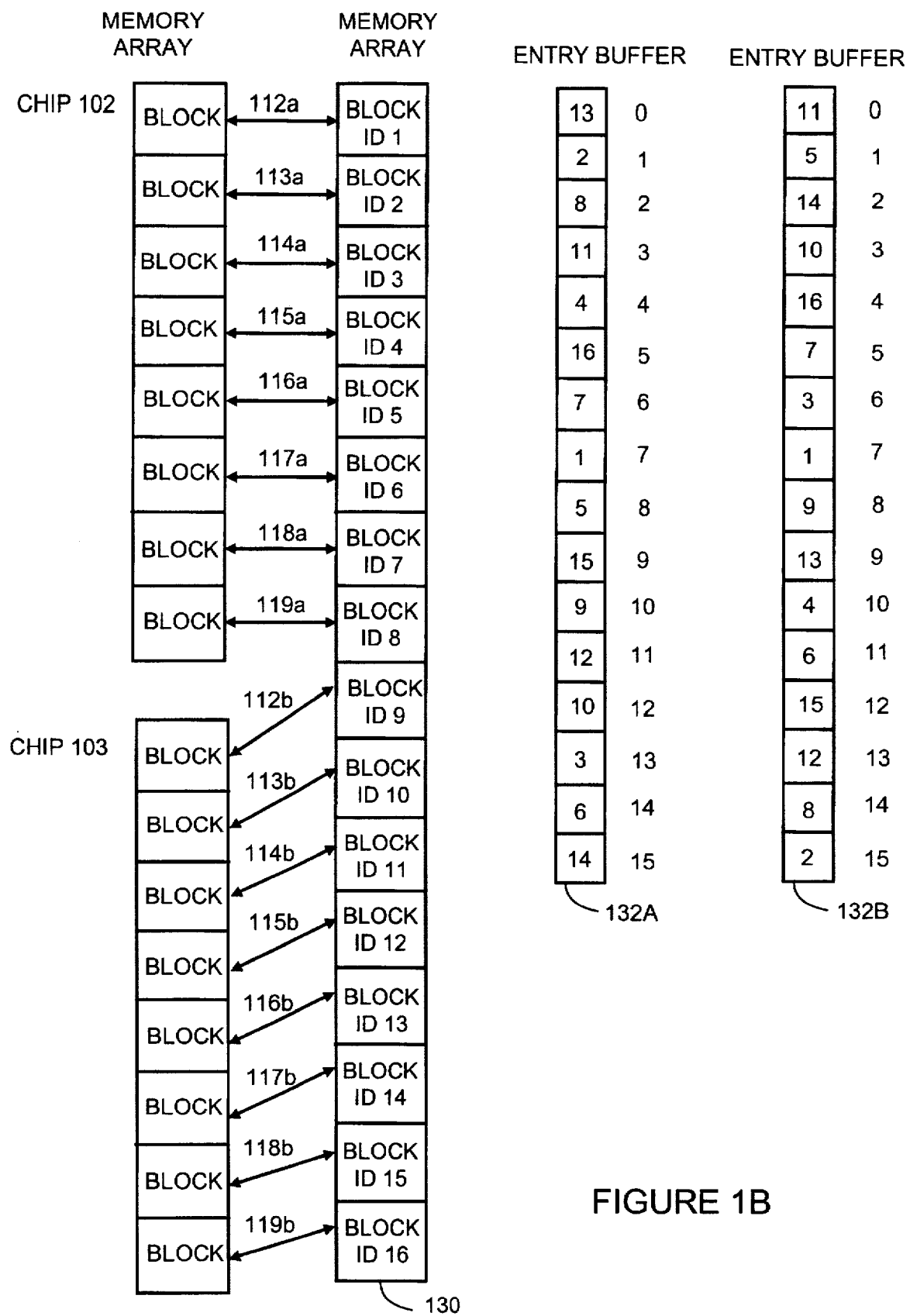
FIGS. 1B–1D show the logical structure of the flash memory system of the present invention.

The following is an example that shows one organization. It should be noted that the number of blocks used in this example is for illustrative purpose only, and an actual flash memory system could have many blocks. It is assumed that eight of the blocks in each chip are used in the array (the other blocks may be used for other purposes). Each memory block has a unique identification number (the "block ID"). In FIG. 1B, blocks 112a–119a of chip 102 and blocks 112b–119b of chip 103 are assigned, sequentially, block ID 1–16. These sixteen blocks now form a memory array 130. Because there is a one-to-one correspondence between a physical block and its block ID, the location of each block can be uniquely identified by specifying its block ID. In this sense, the block ID can be considered a form of block physical address. In one embodiment of the present invention, each block is further divided into sectors. In this embodiment, reading and writing of data is perform a sector at a time.

The block IDs can be arranged into various logical orders. In FIG. 1B, a buffer 132a is used to store the block IDs. This buffer is herein called an "entry buffer." Buffer 123a contains a number of registers (sixteen in the present example because there are sixteen block IDs). In FIG. 1B, they are labeled from 0 to 15. Each register in the buffer is called an "entry". Each entry can be used to store an unique block ID.

As explained in more detail below, one aspect of the present invention is that the physical blocks in the present invention can undergo various logical transformations. Thus, the same physical block may contain data related to a first logical address at one time and a second logical address at another time. Buffer 132a can be used to implement a linear addressing scheme by associating the physical blocks with logical addresses. In FIG. 1B, each register in buffer 132a is associated with a range of logical addresses. The registers are arranged sequentially in a logical manner (e.g., from "0" to "15") so that there is a one-to-one relationship between the logical position of the registers and the logical address of data. Each register contains a block ID of the physical blocks used to store data having the associated addresses. For example, the first three registers in buffer 132a contain block ID 13, 2 and 8. As the blocks go through transformations, different physical blocks will be used to stored data in the same address range. For example, FIG. 1B shows another arrangement, shown as entry buffer 132b, in which the first three registers contain block ID 11, 5 and 14. Note that in this example, buffers 132a and 132b are used to illustrate the different values stored in the same physically buffer.

Figure 1C:
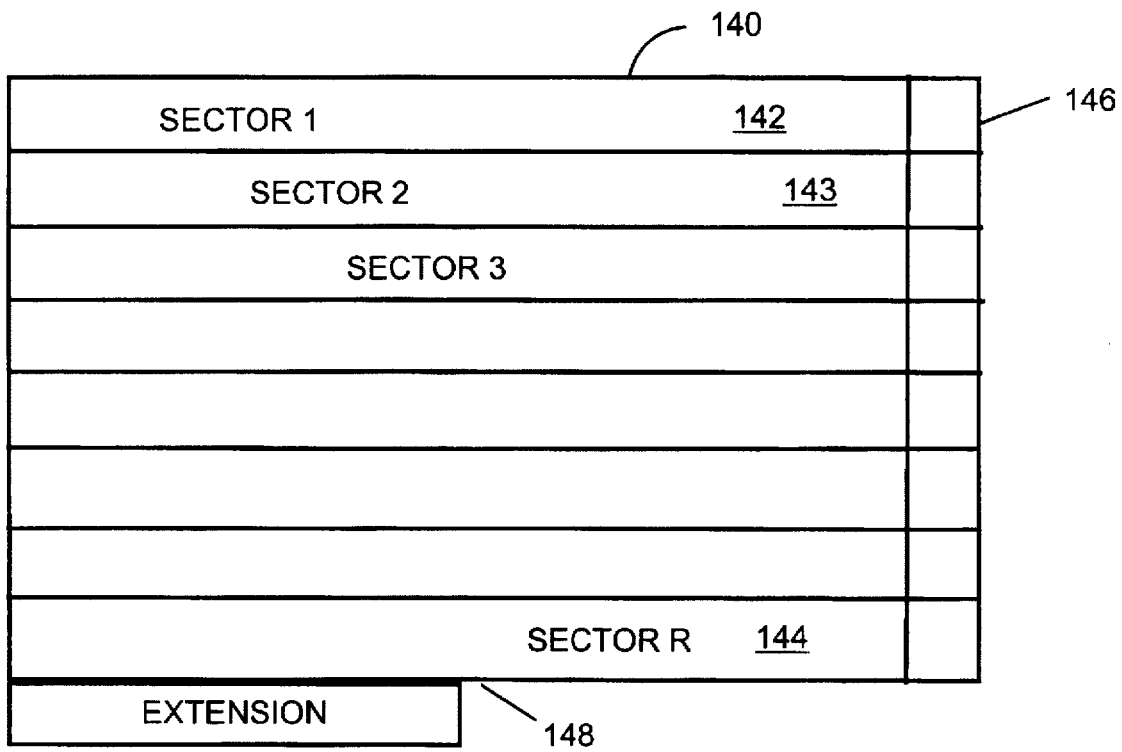

The flash memory system of the present invention can be used as mass storage in a large variety of information processing systems. As an example to show the operation of the present invention, flash memory system 100 is used to emulate a hard disk. FIG. 1C shows a block 140 in flash memory system 100. Block 140 is divided into r sectors, such as sectors 142–144. Block 140 also contains a memory region 148 (labeled as "extension") for storing attribute information related to block 140. Each sector also contains a sector attribute region (such as region 146 of sector 142) for storing attribute information of the sector.

(B) Mapping Logical Memory Address into Physical Flash Memory Address

As pointed out above, an essential function of a flash memory system is to store data and program. Typically, data and program are organized in a sector-based addressing scheme so that each piece of data can be uniquely identified. The flash memory system of the present invention can be designed to be compatible with this addressing scheme so that an external system can access flash mass storage by specifying the logical sector address.

Figure 1D:
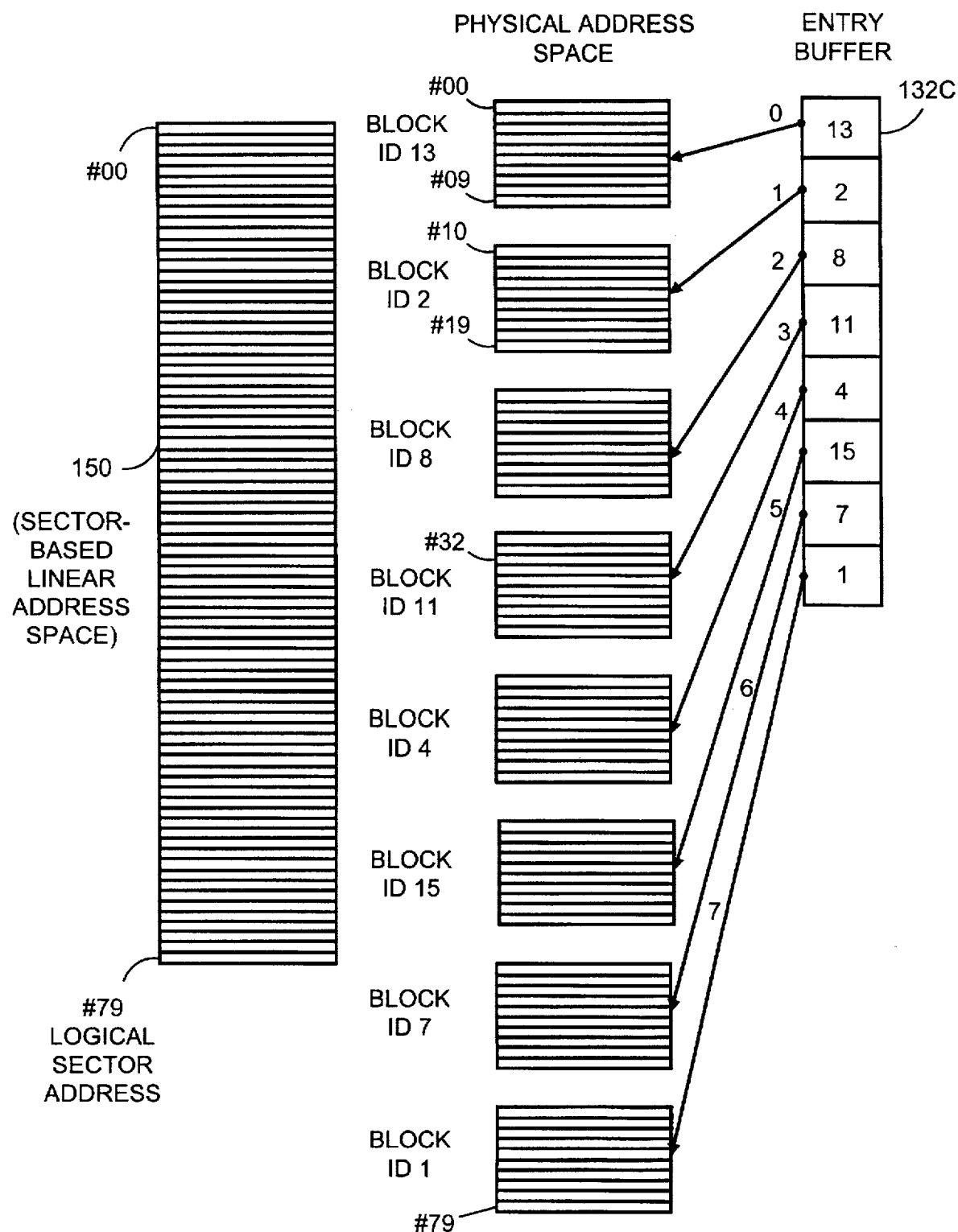

FIG. 1D shows an example that uses the flash memory system 100 of the present invention to implement typical memory organization. Many software systems (such as Microsoft's DOS operation system and Windows) use a sector-based linear addressing scheme to locate data in the mass storage. In this addressing scheme, memory address in a logical memory 150 increases linearly. The smallest addressable unit of memory space is a sector (which corresponds to the sectors 142–144 of FIG. 1C), i.e., data is read and written a sector at a time instead of a byte or a word at a time. The size of a sector can be chosen in accordance with the design of a file system. In the example shown in FIG. 1D, the starting sector address is shown as "00" and the highest sector address is shown (for illustrative purposes only) as "79." These logical sectors are grouped into logical blocks, and these logical blocks are mapped (using entry buffer 132c) into their corresponding physical blocks. The order of sectors in a physical block is retained as its corresponding logical block.

As an example, every block in FIG. 1D is assumed to contain ten sectors. In this example, numbers are in decimal form (instead of binary or hex representation). According to register number "0" of entry buffer 132c, a block having a block ID of 13 is assigned to be the first block of the logical address space. Thus, the sectors in this block correspond to logical sector address of "00" to "09." According to register number "1" of entry buffer 132c, a block having a block ID of 2 is assigned to be the second block. Thus, the sectors in this block correspond to logical sector address of "10" to "19." The same relationship holds for the other registers.

In order to use the inventive flash memory system to store data, controller 110 must be able to access data originated from an external system into uniquely identifiable sectors in the flash memory system. The above described logical sector address provides the interface between the external system and the flash memory system. The external system can indicate the position of the data to be accessed by specified its logical sector address. When a logical sector address is known, the logical sector address can be calculated by dividing the number of total sectors within one block into the logical sector address. The quotient of this division is the logical block address and the remainder is the sector number within that logical block. The physical block address can be found by looking up a logical-physical block map table.

The following example illustrates how to obtain the physical location of a sector if its logical sector address is know. Assuming that a logical sector address #32 is given (see FIG. 1D), this address is divided by the number of sectors within one block (which is ten in this example). The quotient of the division is 3 and the remainder is 2. Therefore, the logical block address is 3, which is the quotient of the above division. This translates into physical block ID of 11, as can be obtained from the content of the entry buffer indexed 3. The remainder 2 of the above division is the sector order relative to the above obtained physical block ID. Because sector number starts with 0, the sector with logical sector address #32 is located at the third sector of the block with physical block ID of 11.

The entry buffers shown in FIG. 1B–1D is preferably implemented in RAM (static or dynamic). This is because information in the entry buffer needs to be changed frequently, and it may reduce efficiency if the entry buffer is implemented in a flash memory.

It is known that data stored in RAM will be erased after a computer system is powered down. Consequently, the information in an entry buffer will be lost when powered down. However, it is possible to reconstruct the content of the entry buffer by using the attribute information stored in the extension region of each block.

(C) Reading and Writing Data into the Memory System

The system of the present invention is used to store information. Consequently, it is necessary to write to and read from the blocks and sectors of the present invention. As mentioned above, a flash memory cannot be overwritten prior to erasure. Thus, it is necessary to introduce new structures, in additional to the blocks used for storing data.

In one embodiment of the present invention, the blocks are divided into working (W) blocks, a temporary Q buffer, and an erasable (E) queue. The W buffer is used to store data. The Q buffer is used as a temporarily write buffer to a selected W block. This is needed because W blocks cannot be updated directly. Blocks that should be erased are placed into the E buffer. As explained below, the introduction of the E queue arises from the need for block recycling so that an almost infinite supply of Q buffers can be generated from a fixed number of physical blocks. The preferred size of the E queue are determined by user applications.

(1) Data Writing Operation

Figure 2A:
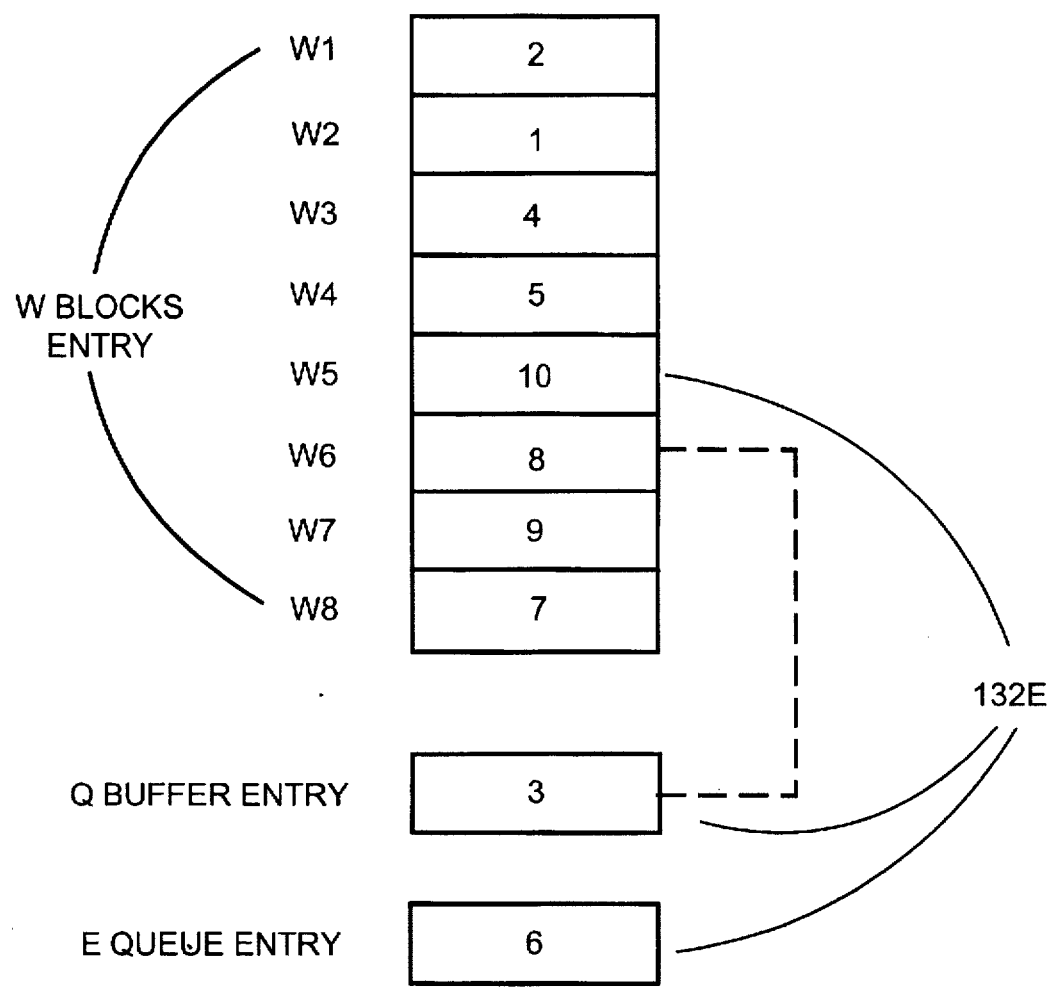
FIGS. 2A–2D show a write operation in accordance with the present invention.

FIG. 2A illustrates a method for writing in accordance with the present invention. It is assumed that there are a total often blocks. Again, it should be pointed out that the number of blocks in FIG. 2A is for illustrative purpose only, and the actual number of blocks could be very large. Their block IDs are contained in an entry buffer 132e. Eight of these blocks are used for storing data (these blocks are the above mentioned W blocks). The remaining block could be assigned to the Q buffer or E queue. Note that the number of blocks in each category in this example is illustrative only; different user applications could assign different number of blocks to the categories.

One method of writing involves writing sequentially to the W blocks, one at a time. In the present invention, the W blocks cannot be directly written into. Instead, the Q buffer is used to receive the data. In FIG. 2A, it is assumed that a block with block ID of 3 is assigned to be the Q buffer. It is also assumed that this Q Buffer is used as a surrogate to the W block having a linear logical block address corresponds to the sixth block. This block has a block ID of 8. Thus, any data which is intended to be written to the sixth block is written into the Q buffer.

Figure 2B:
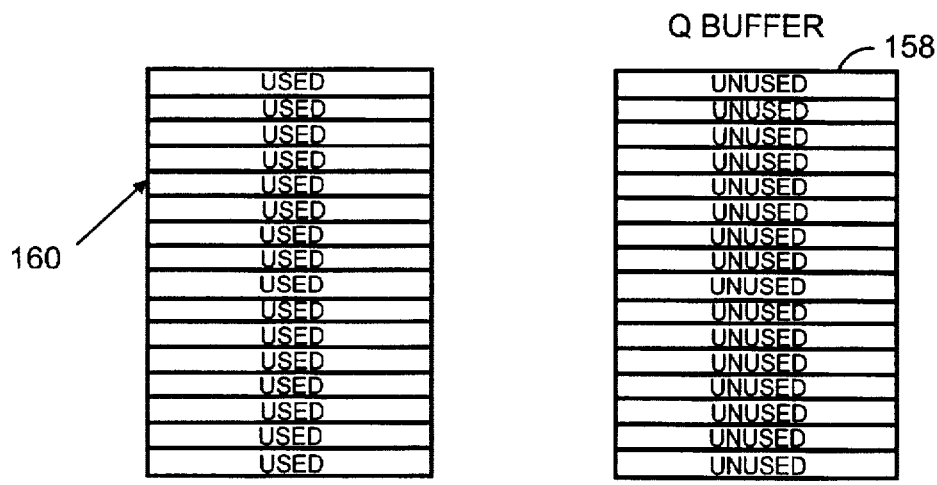

FIG. 2B shows the initial state of the Q buffer 158 and the sixth block 160. These two blocks contains a plurality of sectors. It is assumed that all the sectors in the ninth block 160 contains data and are marked "used". On the other hand, all the sectors in the Q buffer 158 are marked "unused" because the Q buffer is initially clean.

Figure 2C:
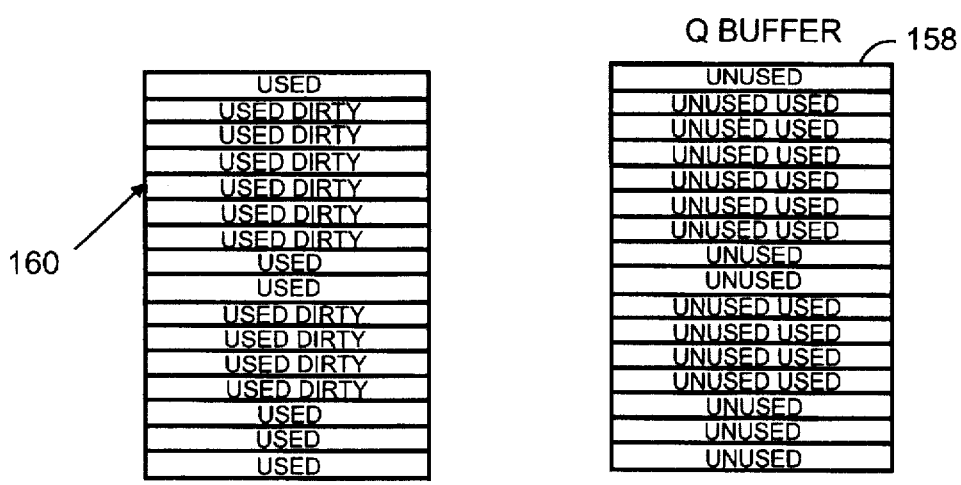

When data is written into the Q buffer 158, the corresponding sectors in the Q buffer are marked "used". Immediately afterward, the corresponding sectors in sixth block 160 are marked dirty. This is shown in FIG. 2C.

Figure 2D:
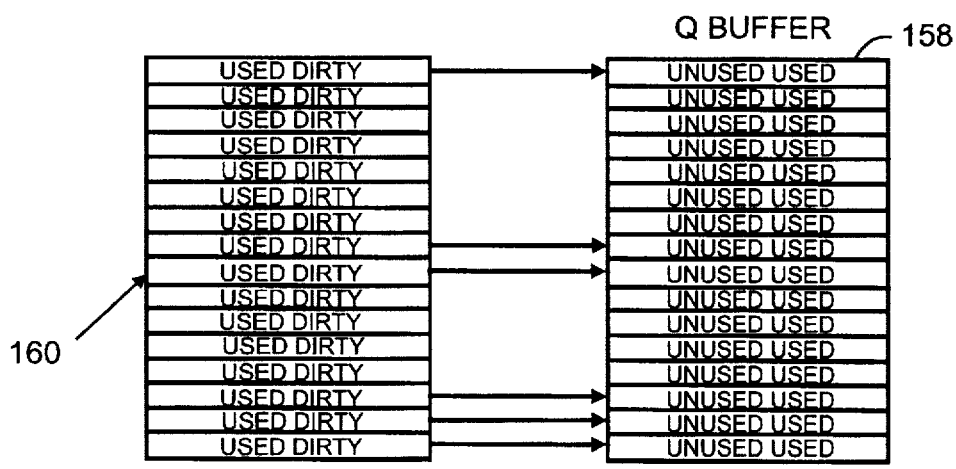

When it is desirable to assign a Q buffer to service another W block, it is necessary to copy all the valid data in the sixth block 160 to the Q buffer 158. Again, the following steps are followed in the copying: (i) mark a sector in the Q buffer used, then (ii) mark the corresponding sector in the W block dirty. This is shown in FIG. 2D.

Figure 3:
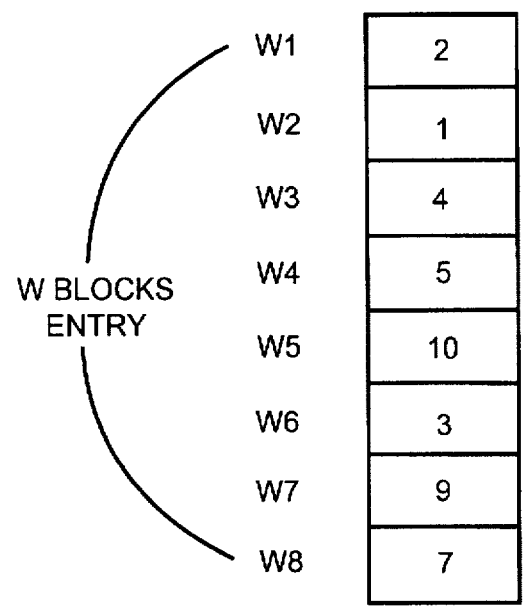
FIG. 3 shows the status of blocks after the write operation of FIGS. 2A–2D.

After the data transferring is completed, the block having a block ID of 8 is changed into one block of the E queue. The original Q buffer having block ID of 3 replaces the sixth W block. This is shown in FIG. 3.

Figure 4:
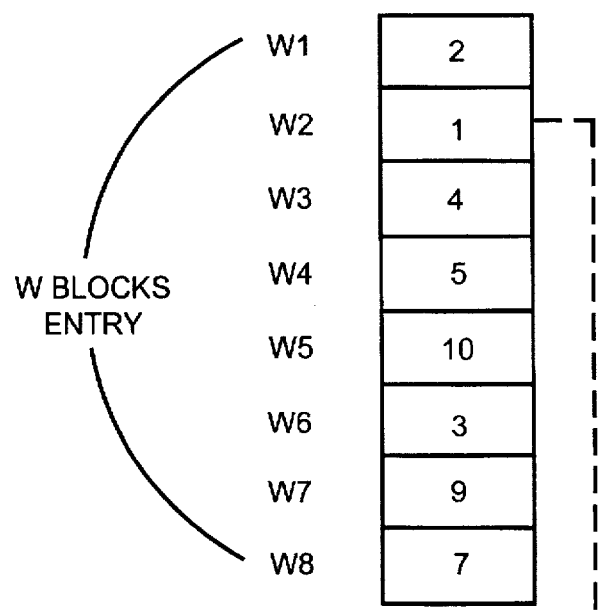
FIG. 4 shows the status of blocks when data needs to be written into another block in accordance with the present invention.

If it is necessary to write to the another W block, another Q buffer needs to be allocated. One of the blocks in the E queue is erased and changed into a Q buffer. This is shown in FIG. 4, in which the block having a block ID of 6 is selected to be erased. This block will then be changed into a Q buffer. This block is then used to service the intended W block (the second W block in FIG. 4).

(2) Data Reading Operation

In terms of addressing, reading is similar to writing. Most data writing involves writing a stream of data to a specific range of logical sector address. Thus, it is necessary to map the specific logical sector address to the W blocks first, and then perform the above described writing operation. Similarly, reading is normally performed on a specific range of logical sector address.

When an application wishes to perform a reading task, it sends a command to controller 110 of FIG. 1. Controller 110 then calculates the corresponding physical address where the requested data is stored and return the data to the application. The method of mapping logical sector address to physical location where data is stored is described above under the section entitled "Mapping Logical Memory Address into Physical Flash Memory Address." As described in the above data writing operation, valid data can be stored in the W blocks or the Q buffer. If controller 110 finds that the data to be read is located in a W block which is not served by a Q buffer, the data in the W block must be valid and this range of data will be returned to the application. If the data to be read is located in a W block that is being served by a Q buffer, the actual returned data could come either from the W block or the Q buffer, depending on whether the data in the W block is valid. There should be one copy of data that is valid because the old data in a W block is marked dirty after new data is written into its corresponding Q buffer.

(D) Block Recycling

As explained above, one of the characteristics of the flash memory system of the present invention is that blocks are divided into several categories, each is designed to perform a specific function. The above example also shows that there is a need for a constant supply of Q blocks. Further, dirty blocks need to be discarded. Because the number of blocks in a flash memory system is finite, there is a need to turn these dirty blocks into Q blocks. In the present architecture, blocks can be transformed from one category into another. As a result, there is an apparent endless supply of Q blocks.

The transformation of physical blocks is now described. In the present invention, a memory block can be placed in one of the following categories: erasable-clean ("E/C"), bad ("B"), main working block ("W"), sequential buffer ("Q"), and non-sequential buffer ("X"). The X buffer is used for non-sequential write, which is different from the Q buffer used for the above described sequential write. The details of non-sequential write will be described in detail in a separate section.

One of the characteristics of flash memory is that blocks could become defective during operation. These blocks should be marked so that they will not be used again. Blocks in the B category are blocks that are defective. This category is included here so that a complete picture of the block transformation can be presented.

Figure 5:
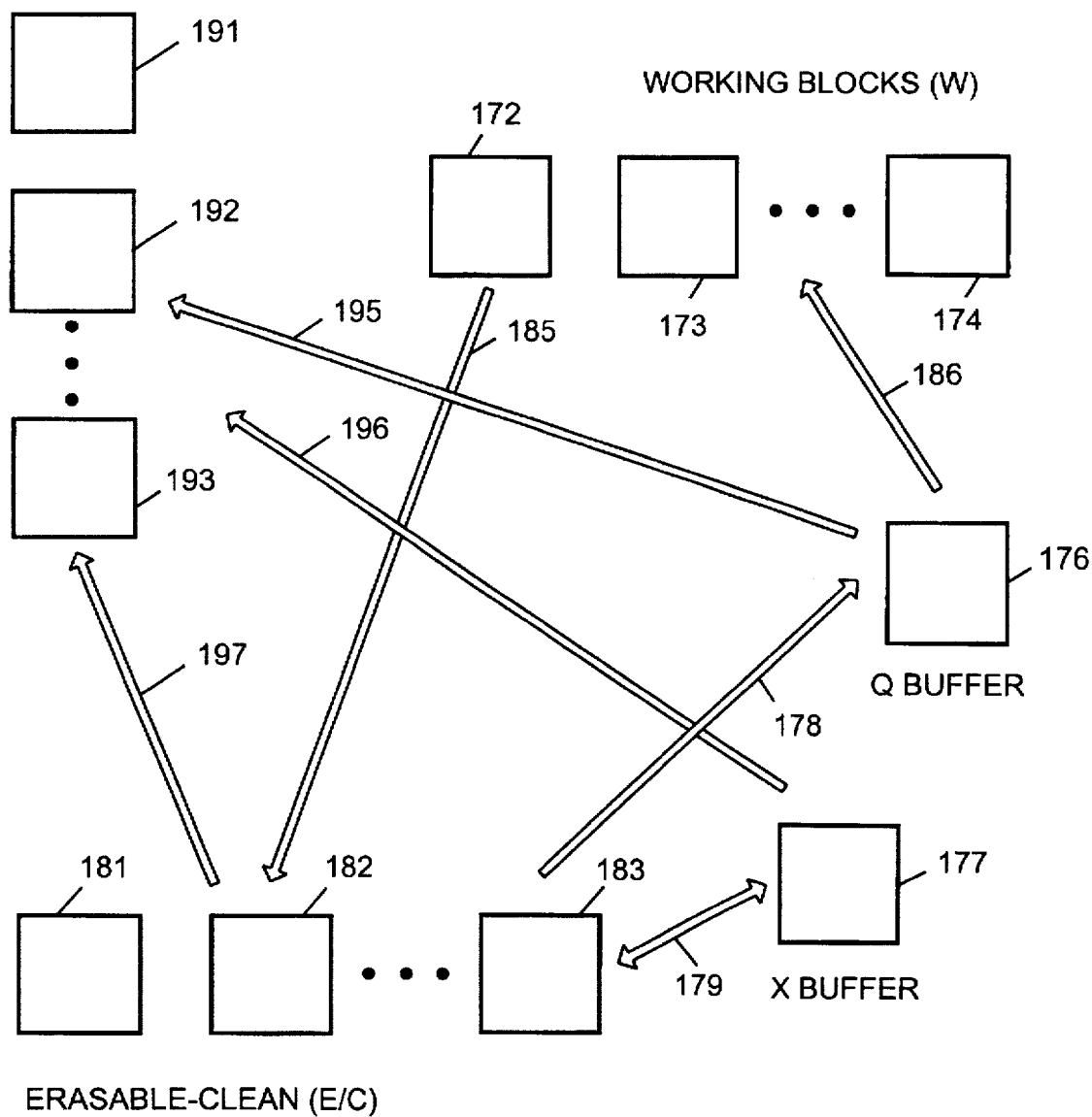
FIG. 5 is a schematic diagram showing the transformation of the blocks of the present invention from one category to another.

The relationship between these categories is shown in FIG. 5. In this architecture, the W blocks (e.g., blocks 172–174) are used to store data in a linear addressing scheme. Thus, each W block is associated with a certain address range in the scheme. In many situations, there are a large number of W blocks. Data cannot be written directly into the W blocks. Writing of new data can be directed to either a Q buffer 176 or an X buffer 177. In this embodiment, the Q buffer is used for sequential writing of new data and the X buffer is used for non-sequential writing of new data. The Q and X buffers are obtained, when needed, from a pool of clean blocks (such as blocks 181–183) in the E/C category (shown by arrows 178 and 179). W blocks with old or invalid data can be marked dirty and then placed into the E/C category (shown by an arrow 185). Dirty blocks in the E/C category are erased to make clean blocks. At appropriate times (as described in detail below), a Q buffer can be changed into a W block (shown by an arrow 186) and an X buffer can be placed into the E/C category (shown by the bi-directional arrow 179). If some of the blocks are defected, they will be placed into the B category (e.g., blocks 191–193). This is shown by arrows 195–197 in FIG. 5.

As discussed above in connection with FIG. 1C, each block has an extension region 148. This region stores attribute information that can be used to determine the category of a block. The detail of the attribute information will be described below.

(E) Identifying Categories of Blocks and Sectors

What is described above is the architecture of the present flash memory system. It is able to handle storing data in accordance with a sector-based addressing scheme, updating data therein, and retrieving data therefrom. One aspect of the architecture is that blocks are divided into categories. Consequently, there is a need to determine which category is a block belonging to.

As pointed out above in connection with FIG. 1C, each sector has a sector attribute region and each block has a extension region for storing status information of a sector and category information of a block, respectively.

Other methods to use the sector attribute region and the extension region are disclosed in a patent application entitled "Method and System for Managing a Flash Memory Mass Storage System" (attorney docket number 17538.871) filed on the same date and by the same inventors of the present application. The disclosure of the "Method and System for Managing a Flash Memory Mass Storage System" patent application is incorporated herein by reference.

(F) Alternative Embodiment: Implied Dirty

It can be seen from the above description that the architecture of the present invention is flexible and can handle problems arising from the peculiar property of flash memory. However, it is possible to further improve the performance. An alternative procedure, called "implied dirty," can be used advantageously in the present invention. As explained below, this procedure reduces the number of times a flash memory needs to be programmed for the purpose of marking old data dirty. Because the length of time for programming is relatively long, this procedure can improve the performance of the flash memory system of the present invention.

Figure 6A:
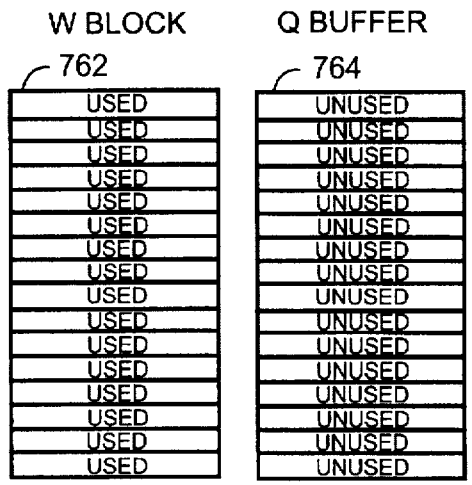
FIGS. 6A–6F illustrate the "implied dirty" procedure of the present invention.
Figure 6D:
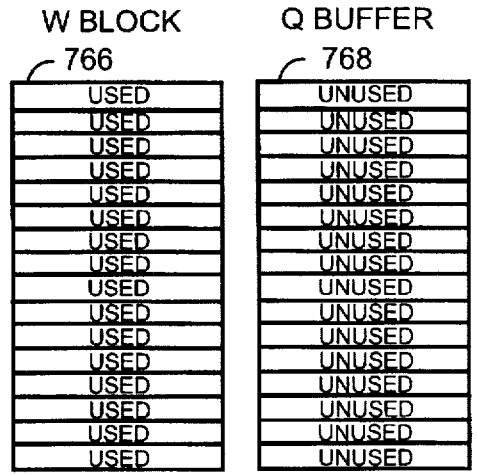
Figure 6B:
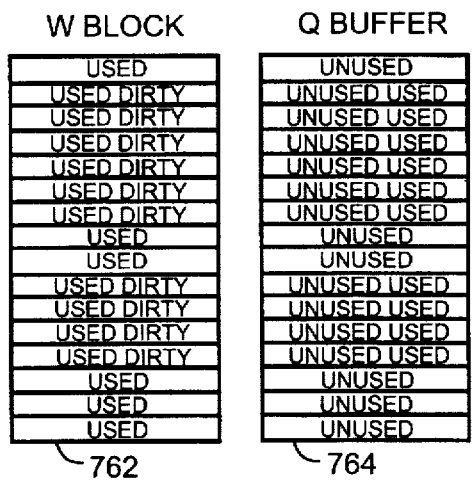
Figure 6E:
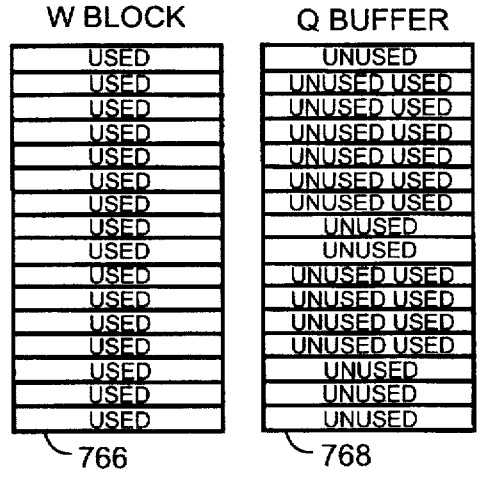
Figure 6C:
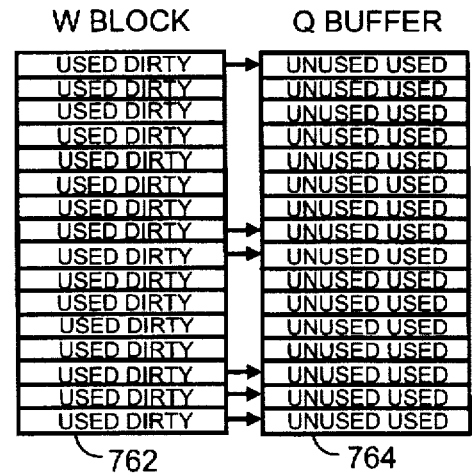
Figure 6F:
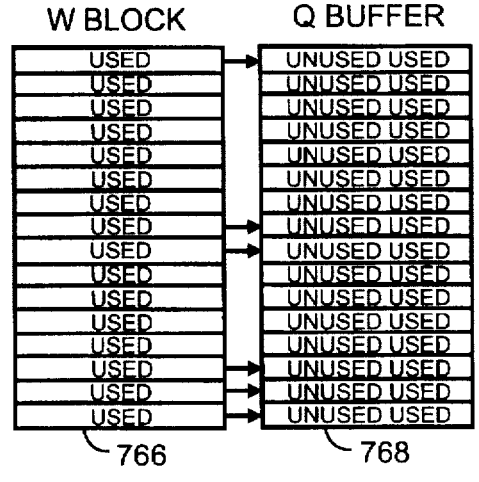

An example illustrating the implied dirty procedure is depicted in FIGS. 6D–6F. In order to illustrate the differences between this procedure and the regular procedure (described in FIGS. 2B–2D), the corresponding regular procedure is shown in FIGS. 6A–6C. FIG. 6A shows that all the sectors in a W block 762 are used to stored data (labeled as "used"). On the other hand, all the sectors in an Q buffer 764 that serves W block 762 are not used (labeled as "unused"). Thus, Q buffer 764 is a clean buffer. FIG. 6B shows that some of the unused sectors in Q buffer 764 are used to store data (labeled as "unused used" and will be referred herein as "used"). The corresponding sectors in the W block 762 are marked dirty (labeled as "used dirty" and will be referred herein as "dirty"). When it is necessary to clean up W block 762, all the valid data therein (i.e., those that are labeled "used" and not "dirty") need to be copied to Q buffer 764. FIG. 6C shows Q buffer 764 and W block 762 after a clean up operation. All the sectors in Q buffer 764 are now marked "used" and all the sectors in W block 762 are now marked "dirty."

The situation in the implied dirty procedure that corresponds to FIG. 6A is shown in FIG. 6D. Again, all the sectors in an W block 766 are used to stored data (labeled as "used"). On the other hand, all the sectors in an Q buffer 768 are not used (labeled as "unused"). FIG. 6E shows that some of the unused sectors in Q buffer 768 are used to store data (labeled as "unused used" and will be referred herein as "used"). However, the corresponding sectors in W block 766 are not marked dirty. Thus, all the sectors in W block 766 remain at the "used" state. There is no need to marked the corresponding sectors in W block 766 dirty because they will be considered dirty if the corresponding sectors in Q buffer 768 are labeled "used." When it is necessary to clean up W block 766, the Q buffer is scanned first. Only the sectors in W block 766 corresponding to the "unused" sectors in Q buffer 768 need to be copied to the Q buffer. FIG. 6F shows the result of a clean up operation. All the sectors in Q buffer 768 are now labeled "used" after copying. However, there is no need to mark the sectors in W block 766. As a result, there is no need to program W block 766 for the purpose of marking the sectors dirty. Consequently, the operation is simplified and the performance improved.

In reading data processed using the implied dirty procedure, the Q buffer needs to be scanned first. If the data in the Q buffer is marked "used", this data is valid data. If the data in the Q buffer is marked "unused", it is necessary to go to the corresponding sector of the W block to find the valid data.

(G) Alternative Embodiment: Non-sequential Write and Read

Although it is possible to set up a flash memory system using the above described W blocks, Q buffer and erase queue, this system may not be able to effectively handle random updating of data. If the sector updating request does not arrive sequentially but randomly, the system may needs to cleanup Q buffer frequently. The cleanup procedure involves moving valid sectors from a W block to the Q buffer. This is a time-consuming process because the program speed of flash memory is relatively low. Consider the worst case that every time the write request falls at different W block. In this circumstance, whenever a sector is written, the system have to cleanup the Q buffer in order to allocate a new Q buffer for the new write request. Because there is only one dirty sector in the old W block, all the other valid sectors should be moved into the old Q buffer. The overhead of writing one sector is extremely large in this worst case. To overcome this performance issue, a new mechanism of effectively handling random write should be designed. The non-sequential buffer (also called X buffer) is designed for this purpose.

The non-sequential buffer intends to buffer random write and sequential buffer (also called Q buffer) is designed to buffer sequential write. Whenever a write request is accepted, the system first evaluate whether this request is sequential or non-sequential. Data of sequential write will be put into Q buffer. Data of non-sequential write will be put into X buffer if the valid data of this requested address does not exist in the Q buffer. Otherwise, it will also be put into the Q buffer. This restriction is needed because in the present invention, sectors in Q buffer is not allowed to be marked dirty. If the data of non-sequential write is put into X buffer when the valid sector exists in Q buffer, the valid sector in Q buffer should be marked dirty. The Q buffer will eventually be changed into W block. When this occurs, all the valid data in W block should be moved to its corresponding position in the Q buffer. The data of non-sequential write which is put into X buffer should be moved to its corresponding position in the Q buffer. This is not allowed because flash memory cannot be over-written prior to erasing.

All the write request should be classified into sequential or non-sequential write first. The following defines sequential and non-sequential write based on a simple principle. Assume R is the reference sector address and S(n) is the sector address of the nth write request. The nth write request is sequential if $$S(n)=(R+1) \bmod m$$

where m is the number of total sector;

mod is the modulo operation.

The reference sector address R will be assigned a new value of S(n) if the nth write request is sequential. Otherwise, the value of R will not be updated. A non-sequential write refers to all writes that are not sequential.

Although the above definition describes the basic aspect of sequential write, it may not be capable of catching all ordered write sequence. Consider the following order of write requests shown by logical sector address: 1, 2, 3, 5, 6, 7, 8. The first three requests are sequential write according to the above definition. When the third write is completed, the reference sector address is updated to be a value of 3 because the third write is a sequential write. The fourth write with logical sector address of 5 is classified as a non-sequential write so that the reference sector address is not updated. Based on the above definition, all the requests following the fourth request are also classified as non-sequential since the reference sector address is 3. It is obvious that the write requests 5, 6, 7 and 8 arrive in a ordered sequence, which should be classified as sequential. As seen in this example, it is required to further check the non-sequential write so that the ordered sequence of writing, following a non-sequential write, can be identified. For any non-sequential write, the following condition should be checked:

If a non-sequential write S(n) according to the above definition satisfies $$S(n)=(S(n-1)+1) \bmod m$$

where S(n−1) is the logical sector address of the previous write request, the non-sequential write S(n) is defined to be a sequential write and the reference sector address R is updated to be the value of S(n).

This definition shows a non-sequential write can be classified as a sequential write by checking the logical sector address of the previous write request. In practical implementation, it may be necessary to check several previous write requests. Furthermore, the rule of catching sequential write could be dynamically changed to adapt to the current pattern of write sequence. For example, similar rules can be applied to catch reversed sequential write, in which the logical sector address of write sequence is aligned in a descending order.

(1) Writing Using Sequential and Non-Sequential Buffers

Figure 7:
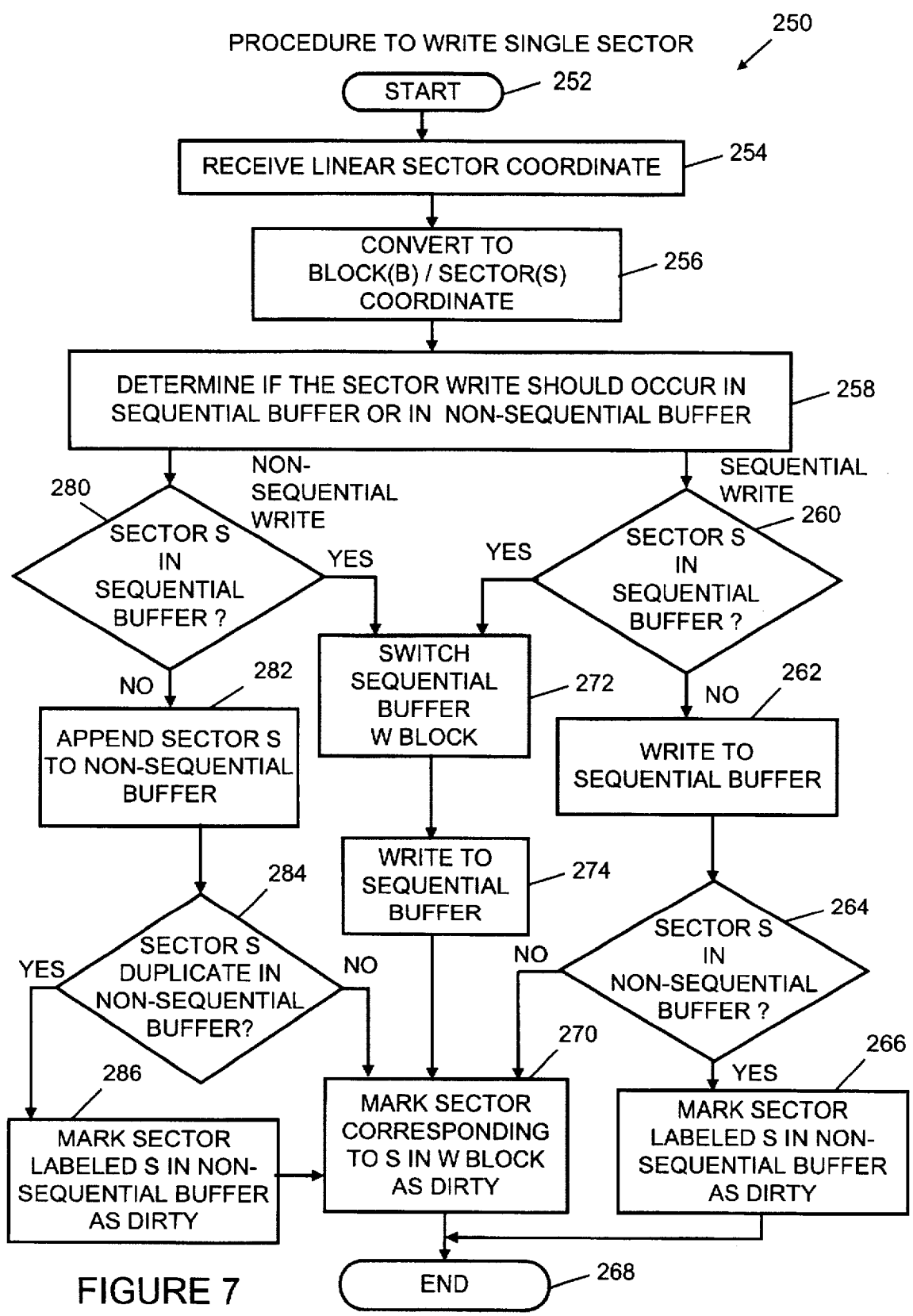
FIG. 7 is a flow chart showing the writing of data in the present invention.

The procedure for reading and writing data in flash memory system 100 is now described. FIG. 7 is a flow chart 250 showing how new or update data is written in appropriate blocks of system 100. Flow chart starts at point 252. At step 254, controller 110 (shown in FIG. 1A) receives the linear sector address of input data. Controller 110 then converts the linear sector address into a logical block and sector coordinate (step 256). In this embodiment, writing is performed a sector at a time. At step 258, controller 110 determines whether the input data should be written to a sequential (i.e., Q) buffer or a non-sequential (i.e., X) buffer. If the writing should be performed in a sequential buffer, controller 110 determines whether the sector address of this input data is the same as the address of data already existed in the sequential buffer (step 260). If the answer is negative, the input data is written into the sequential buffer (step 262). Controller 110 then determines whether the input data sector address is the same as the address of data already existed in the non-sequential buffer (step 264). If the answer is positive, the sector in the non-sequential buffer that has the same sector address as the input data is marked dirty (step 266). Flow chart 250 then terminates (step 268). If the answer to step 264 is negative, flow chart 250 branches to step 270, i.e., the sector in the W block corresponding to the input data sector address is marked dirty. Flow chart 250 then terminates.

It is important to perform steps 264 and 266 because the input data may be an update of data previously stored in the non-sequential buffer as a result of a previous non-sequential write. Consequently, this data needs to be marked dirty. Returning to step 260, if the answer is positive (indicating that the input data address is the same as the address of data in the sequential buffer), controller 110 switches the sequential buffer into a W block (step 272). A new sequential buffer is obtained from the erase queue. The input data is then written into the new sequential buffer (step 274). The new W block (which contains data having the same address as the input data) is then marked dirty (step 270). Flow chart 250 then terminates.

It is important to perform step 272 because flash memory cannot be overwritten prior to erasing. Thus, once a sector in a sequential buffer has been previously written with data, the same sector cannot be written onto again. As a result, a new sequential buffer must be allocated before new data can be written. The situation for non-sequential write is now described. In step 280, controller 110 determines whether the input data address is the same as the address in the sequential buffer. If the answer is negative, the input data is appended to the next available sector in the non-sequential buffer (step 282). The complete address information is also written into the non-sequential buffer because consecutive sectors in the non-sequential buffer could have completely different addresses. Controller 110 then determines if data having the same address has previously been written into the non-sequential buffer (step 284). If the answer is negative, flow chart 250 branches to step 270, i.e., the sector in the W block corresponding to the input data address is marked dirty. Flow chart 250 then terminates. If the answer is positive, the previously written data in the non-sequential buffer is marked dirty (step 286). Flow chart 250 branches to step 270, i.e., the sector in the W block corresponding to the input data address is marked dirty. Flow chart 250 then terminates.

Returning to step 280, if the answer is positive (indicating that the input data address is the same as the address of data in the sequential buffer), controller 110 switches the sequential buffer into a W block (step 272). The input data does not need to be written to the non-sequential buffer in this case. Instead, a new sequential buffer is allocated from the erase queue. The input data is then written into the new sequential buffer (step 274). The new W block (created in step 272 and containing data having the same address as the input data) is then marked dirty (step 270). Flow chart 250 then terminates.

In the above embodiment, the sequential and non-sequential buffers are written prior to marking the corresponding W block dirty. This order of operation ensures that the old data remains valid until the new data has been correctly written. If the W block is marked dirty first and there are problems in writing new data to the sequential or non-sequential buffer, it would be impossible to recover the old data. This is because there could be more than one dirty W blocks having the same address. Thus, it would be impossible to know which dirty block is the block most recently marked dirty.

(2) Reading Involving Sequential and Non-Sequential Buffers

Figure 8:
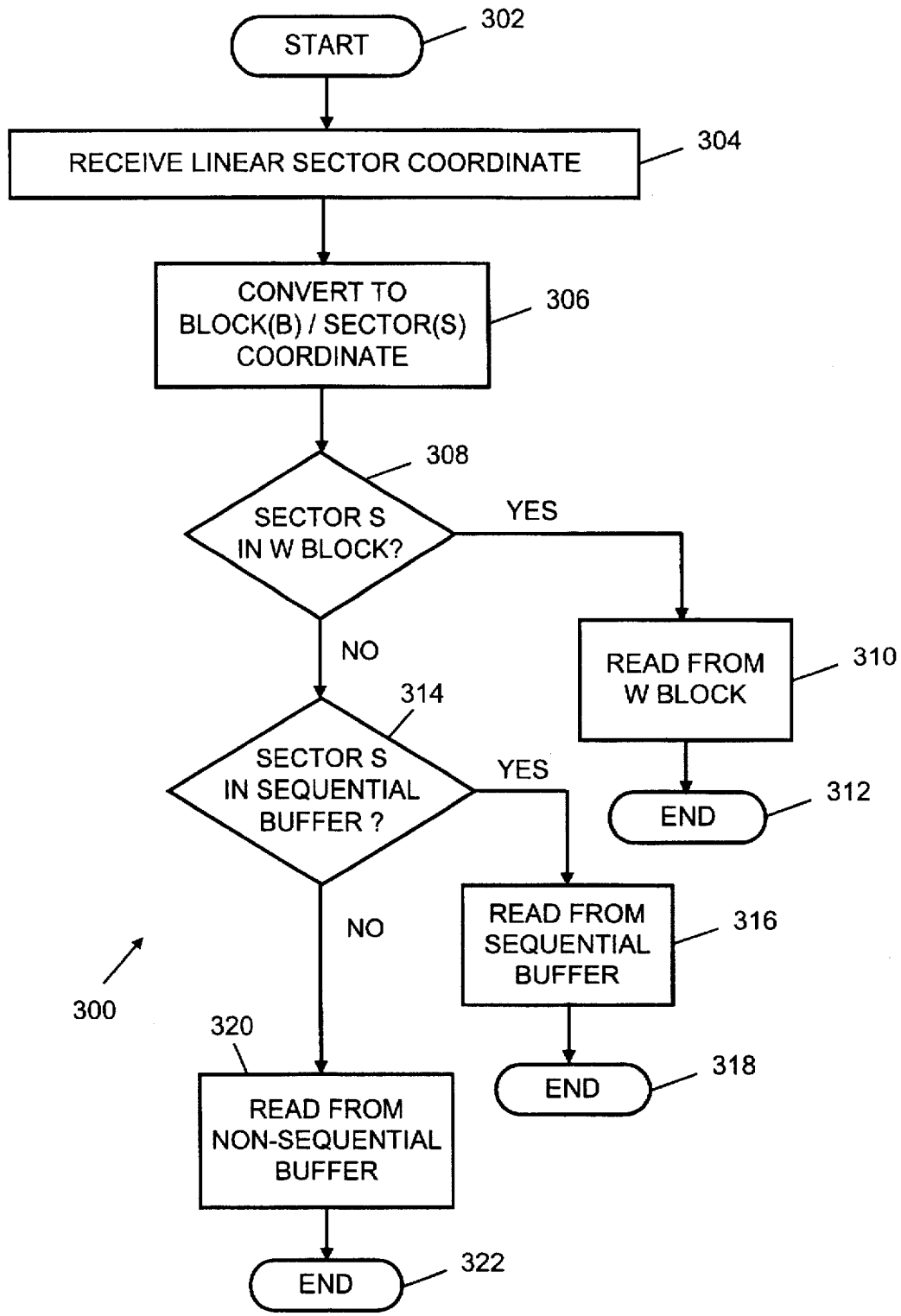
FIG. 8 is a flow chart showing the reading of data in the present invention.

The procedure in reading a single sector of data is show in flow chart 300 of FIG. 8. Flow chart 300 starts at point 302. At step 304, controller 110 receives the linear address of the sector of interest. At step 306, controller 110 converts the linear address into a W block and sector coordinate using the mapping described above. At step 308, controller 110 determines whether the desired sector is in the W block determined in step 306. If the answer is positive, data is read from the W block (step 310). Flow chart 300 terminates (step 312).

If the answer to step 308 is negative, the sequential buffer is searched to determine if it contains the desired sector (step 314). If the answer is positive, data is read from the sequential buffer (step 316). Flow chart 300 terminates (step 318). If the answer to step 314 is negative, data is read from the non-sequential buffer (step 320). Flow chart 300 terminates (step 322).

(3) An Example Illustrating Sequential and Non-Sequential Write

Figure 9:
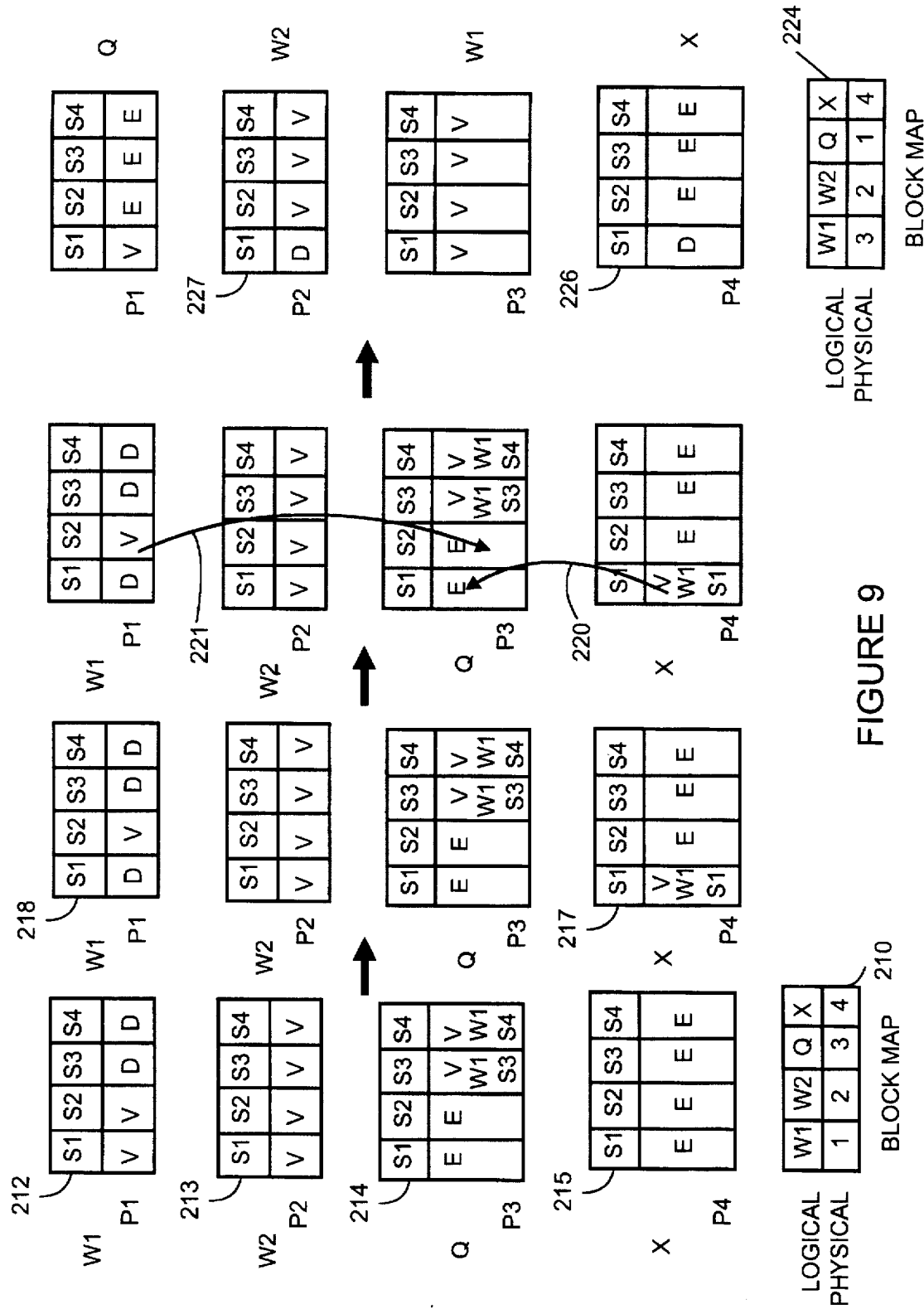
FIG. 9 illustrates an example of writing data to the flash memory system of the present invention.

This section is provided to further illustrate the interaction between block cycling, sequential write and non-sequential write. An example to illustrate the interaction is provided here and is shown in FIGS. 9. For simplicity, it is assumed that there are four physical blocks having block IDs 1 to 4. Initially, the blocks having block IDs 1 and 2 function as the W blocks W1 and W2, respectively; the block having block ID of 3 functions as a Q buffer and the last physically block functions as a X buffer. The mapping between the block ID and categories is shown in a block map table 210. It is also assumed that each block has four sectors (S1 to S4). In this example, it is assumed that data needs to be written sequentially into the following sectors: (W1,S3), (W1,S4), (W1, S1), (W2,S1). Initially, the two W blocks are assumed to contain valid data (shown in FIG. 3 by a symbol "V") while the Q and X buffers are assumed to be empty (shown in FIG. 9 by a symbol "E").

In this example, a Q buffer is allocated to service W1 because the first write is to the W1 block. Data that should be stored into (W1,S3) is written into the third sector of the Q buffer. After the data is written into the Q buffer, the data existed in sector S3 of block W1 is marked dirty (shown in FIG. 9 by a symbol "D"). Similar steps are used in writing data that should be stored into (W1,S4) because this is a sequential write. At this time, the content of W1 is shown in box 212, the content of W2 is shown in box 213, the content of the Q buffer is shown in box 214, and the content of the X buffer is shown in box 215.

The writing to (W1,S1) does not follow a sequential order of (W1,S4). Thus, the data is written into the X buffer (see box 217). Sector S1 of the W1 block is marked dirty (see box 218). There is no change in W2 and the Q buffer.

The writing to (W2,S2) is now described. This write request falls out of the service range of the Q buffer. As a result, this Q buffer must be cleaned up so that a new Q buffer can be allocated to service this write request. All the valid data in the X buffer that belongs to the W1 block must be moved to the Q buffer (shown as arrow 220 in FIG. 9). In FIG. 3, sector S1 of the X buffer will be marked dirty (shown in box 226). All the valid data remaining in W1 block must also be moved to the Q buffer (shown as arrow 221 in FIG. 9). The Q buffer is then transformed into a new W1 block (by changing attribute information in the extension region). The old W1 block is placed in the E/C category.

After erasure of the old W1 block, it becomes usable. In this example, it is allocated as a new Q buffer. This Q buffer is used to service the W2 block. The content of the block map table is changed to the one shown in box 224. Note that in a memory system that has many blocks (instead of only four blocks), the new Q buffer does not have to come from the old W1 block.

The new data for (W2,S1) is now written into sector S1 of the new Q buffer (shown by a symbol "V"). The corresponding sector in the W2 block is marked dirty (shown in box 227).

The steps depicted in FIG. 9 to handle the case in which a write request is outside the service range of a Q buffer is referred in this patent application as the "Q buffer promotion."

(H) Alternative Embodiment: Management Unit

The above described system is an efficient system for using flash memory as a mass storage system. Regularly, the entry buffer is implemented using DRAM or SRAM. For some situations, the present system is implemented in a system with limited size of SRAM (e.g., microcontrollers). Because the SRAM is a scare resource, it is desirable to reduce the size of the entry buffer. One method is to group a number of blocks into a "management unit." Each register in the entry buffer is used to store a physical ID of the management unit. Because the number of management unit is less than the number of blocks, the number of registers in the entry buffer can be reduced. The size of a management unit can be defined by users to meet their cost-performance requirements.

In the embodiment where management unit is used, all the block recycling, cleanup operations and Q buffer promotion are based on the management units. As a result, more data needs to be processed (e.g., moved in the recycling operation) in each operation. Consequently, the performance of the system is lowered. Thus, the use of the management unit involves a trade-off between SRAM and performance. The system described prior to this section corresponds to the situation where the size of the management unit is one block, and has the highest performance.

(I) More Details on Category Transition

The transition of the categories is further described here.

(a) E/C block to Q buffer

As pointed out above, data cannot be directly written into a W block. Instead, a Q buffer is assigned to serve as a surrogate for the W block. Data that should normally be written into the W block is written into this Q buffer first. When the Q buffer is full, it is changed into a W block (by changing the attribute information in its extension region). Whenever a sequential write occurs and this new data is not locate at the W block being served by the current Q buffer, a new Q buffer will be allocated from the E/C blocks to serve as a write buffer for the new W block. Before the new Q buffer is allocated, the old Q buffer must be first changed to a W block. The transition from a E/C block to a Q buffer involves changing a small number of attribute bits in its extension region.

(b) Q buffer to W block

There are several situations when a Q buffer have to be changed into a W block. One condition is when a sequential write request falls out of the service range of a Q buffer. This situation has been described in detail above in connection with E/C block to Q buffer transition. Another condition is when a X buffer is full: all the data buffered in the X buffer needs to be written back to the W block to which the data belongs (this procedure is called X buffer clean up). If this condition occurs and there is data in X buffer belonging to the W block being served by the Q buffer, the Q buffer should be changed into W block. This transition involves the following steps (this procedure is called the "Q buffer promotion"):

(i) Move valid sector from X buffer to Q buffer if these sectors belongs to the W block being served by the Q buffer. Set dirty the transferred sectors in the X buffer.

(ii) Move valid sector from the W block to corresponding sectors in the Q buffer, and mark all the transferred sectors in the W block as dirty.

(iii) Change the entry buffer so that the Q buffer replaces the position of W block.

(iv) Send the old W block to erase.

In order to clean up all the valid data in X buffer, it is necessary to first scan all the valid sector in the X buffer to find the owners of these valid sectors. For each owner (W block) of valid sector in X buffer, perform the following steps:

(i) Allocate a block from the E/C category as a Q buffer for the owner W block (Q buffer serves as a write buffer for the W block).

(ii) Perform a "Q buffer promotion" procedure as described above.

When the above procedure has been performed, all the data in the X buffer will be marked invalid. This X buffer will be set to the E/C category and then cleaned up so that it can be transformed into other categories. A new X buffer is then allocated from blocks in the E/C category.

(c) W block to E/C block

The transition from a W block to an E/C block occurs at the last step of Q buffer promotion.

(d) X buffer to E/C block

The transition from an X buffer to an E/C block occurs at the last step of the above described X buffer clean up.

(e) E/C block to X buffer

A X buffer is needed when a non-sequential write occurs and there exists no X buffer, or when a non-sequential write occurs and the X buffer is full. When a X buffer is needed, a block from the E/C category is transformed into an X buffer. The transition from E/C to X only involves changing some information on the extension region of the E/C blocks.

(f) Q buffer to B block

The transition from Q buffer to B block occurs when a write attempt to Q buffer fails. In this circumstance, the Q buffer will be marked as a bad block and never be used to store data again.

(g) X buffer to B block

The transition from a X buffer to a B block occurs when a write attempt to the X buffer fails. In this circumstance, the X buffer will be marked as bad block and never be used to store data again.

(h) E/C block to B block

The transition from an E/C block to a B block occurs when a E/C block cannot be erased successfully. In this circumstance, the E/C block will be marked as bad block and never be used to store data again.

The invention has been described with reference to specific exemplary embodiments thereof Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for using flash memory to implement a mass storage system, comprising the steps of:

(a) dividing said flash memory into a plurality of blocks;

(b) forming a first type of blocks from said plurality of blocks, said first type of blocks being used to store data organized in accordance with a pre-defined addressing scheme;

(c) forming a second type of blocks from said plurality of blocks, said second type of blocks being used as a temporary buffer for storing data intended to be written to one of said first type of blocks;

(d) forming a third type of blocks that contain invalid data that will be erased; and (e) changing at least one of said plurality of blocks from one of said first, said second and said third types of blocks to another type.

2. The method of claim 1 further comprising the step of (a) assigning a physical identification to each of said plurality of blocks;

(b) assigning a logical address to each block in said first type of blocks; and (c) mapping said physical identification to said logical address.

3. The method of claim 2 further comprising a step of updating data already stored in a selected one of said first type of blocks.

4. The method of claim 3 wherein said updating step comprising the steps of:

(a) identifying a block in said first type containing data that needs to be updated;

(b) allocating a block from said third type and changing said allocated block into a block of said second type; and (c) writing said updated data into said allocated block.

5. The method of claim 4 further comprising the step of marking said identified block in said first type dirty after said updated data has been written into said allocated block.

6. The method of claim 4 wherein said updating step further comprising the steps of:

(a) changing said identifying block into said third type; and (b) changing said allocated block into said first type.

7. The method of claim 6 wherein said identifying block has a pre-assigned logical address, said step of changing said allocated block changes said allocated block to a block having said pre-assigned logical address.

8. The method of claim 1 wherein said pre-defined addressing scheme is a sector-based addressing scheme.

9. The method of claim 8 wherein said pre-defined addressing scheme is logical block address.

10. A flash memory system comprising a plurality of blocks being divided into (i) a first type of blocks for storing data logically organized in a linear addressing scheme, (ii) a second type of blocks for temporarily storing data intended to be written to one of said first type of blocks, and (iii) a third type of blocks including blocks that should be erased, each of said plurality of blocks comprising a plurality of flash memory cells, said second type of blocks being changeable to said first type of blocks and said first type of blocks being changeable to said third type of blocks.

11. The system of claim 10 wherein each of said plurality of blocks is assigned a physical identification and said first type of blocks is used to implement a logical addressing scheme, said system further comprising a buffer for mapping said physical identification to said logical addressing scheme.

12. The system of claim 11 wherein said logical addressing scheme comprises a sector-based addressing scheme.

13. The system of claim 10 wherein each block comprises a region; said region being used to store attribute information related to a block associated with said region.

14. The system of claim 10 wherein each block contains a plurality of sectors.

* * * * *